United States Patent

[11] 3,621,141

[72] Inventor Donald E. Mack
West Webster, N.Y.
[21] Appl. No. 419,156
[22] Filed Dec. 17, 1964
[45] Patented Nov. 16, 1971
[73] Assignee Xerox Corporation
Rochester, N.Y.

[54] DICODE DECODER
7 Claims, 6 Drawing Figs.

[52] U.S. Cl. .................................................... 178/88,
178/68, 325/321, 328/127
[51] Int. Cl. ....................................................... H04l 25/04
[50] Field of Search ........................................... 325/38,
38.1, 41, 42, 34, 323–324, 473, 483; 178/66, 68,
88; 328/115, 118–119, 127 165; 329/104;
340/347

[56] References Cited

UNITED STATES PATENTS

| | | | |
|---|---|---|---|
| 2,632,053 | 3/1953 | Volz | 328/127 |
| 2,885,662 | 5/1959 | Hansen | 328/127 |
| 3,072,856 | 1/1963 | Glose | 328/127 |
| 2,835,882 | 5/1958 | Beek, Jr. et al. | 340/174.1 H |

FOREIGN PATENTS

| | | | |
|---|---|---|---|
| 896,369 | 5/1962 | Great Britain | 325/38 |

*Primary Examiner*—Benedict V. Safourek
*Attorneys*—Ronald Zibelli, James J. Ralabate and Norman E. Schroder

ABSTRACT: A decoder circuit for a dicode, or three-level signal. The circuit integrates a received diode signal to make a black-white decision based on one-half the normal input pulse energy. Once a decision has been made, a feedback circuit is activated which keeps the decision in its current circuit, until sufficient energy appears to force the decoder into the opposite state.

INVENTOR
DONALD E. MACK
BY Anthony D. Cennamo
Joseph F. Rosenthal

DICODE DECODER

This application relates to a pulse decoding circuit and method adapted for use in receiving data sets.

Data set is a term which has come to indicate the apparatus used to couple binary or digital-type transmitters and receivers to a communications link. At the transmitter location, the data set converts a two-level input signal, from a device such as a computer or a facsimile transmitter, into some other form in the same base band frequency domain, but which is more compatible with the transmission link. At the receiving location, which may be thousands of miles away, the data set receives the transmitted signals from the transmission link, and decodes them into a replica of the original two-level signal for utilization by a computer, facsimile receiver, or the like. The transmission link itself may also include various modulators, demodulators and the like. The decoding problem at the receiving location is difficult because the transmission link, whatever its nature, adds various types of natural and manmade noise to the transmitted signal.

BACKGROUND OF THE INVENTION

It is the primary object of my invention to provide improved means and methods for decoding signals, particularly the type known as dicode signals, in the presence of the noise. It is a further object to provide decoding means and methods exhibiting improved noise rejection properties. Subsidiary objects will become apparent on reading this specification.

In general, I accomplish my objectives by integrating a dicode signal and detecting transitions through the average or median value of the integrated signal. As a further feature of the invention, I provide a latching feed back loop to further provide immunity against unipolarity noise pulses.

DESCRIPTION OF THE DRAWINGS

A further description of the invention will be given in connection with the drawings in which.

DETAILED DESCRIPTION OF THE INVENTION

Figure 1:
FIG. 1 represents a typical binary waveform.
Figures 2A, 2B:
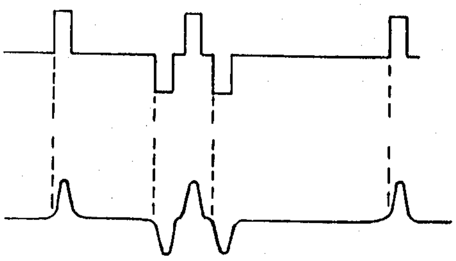
FIGS. 2*a* and 2*b* represent dicode versions of FIG. 1.

FIG. 1 represents an arbitrary two-level waveform representative of signals which are desired to be transmitted over long distances. FIG. 2*a* shows the waveform of FIG. 1 after passing through a common type of transmitting data set. Each positive-going transition of FIG. 1 has been replaced by a positive pulse of fixed amplitude and width and each negative-going transition of FIG. 1 has been replaced by a negative pulse of the same amplitude and width. This type of coding is known as "dicode." It is a three-level type of signal with equal positive and negative pulses superimposed on a baseline voltage. It is equally applicable to synchronous or nonsynchronous signals. The wave form of FIG. 2*a* is normally filtered, either before or during transmission, to remove the higher frequency components. This results in the waveform of FIG. 2*b*, which is representative of the waveform which would appear at a receiving data set in the absence of noise. It is the function of the receiving data set to decode the waveform of FIG. 2*b* back to the waveform of FIG. 1. The signal pulses of FIG. 2*b* should be separated from noise pulses as reliably as possible and with as little phase jitter as possible. This invention is concerned with a circuit and method adapted to decode or translate a waveform of the type shown in FIG. 2*b* to a waveform of the type shown in FIG. 1.

The conventional manner of decoding a signal of the type shown in FIG. 2*b* involves detecting the times when the absolute value of the signal voltages passes through one-half the peak voltage in an increasing direction. Such crossings of the half peak voltage value are taken as indicative of the presence of a dicode signal pulse. The half peak threshold is chosen to provide greatest noise immunity. For example, a positive dicode pulse will be recognized even if there is simultaneously present a negative noise pulse, as long as the noise pulse has less than half the amplitude of the dicode signal pulse. Similarly, a noise pulse will not be falsely detected as a signal pulse unless the noise pulse has an amplitude at least half as great as a true signal pulse. This form of detection discriminates between signal pulses and noise pulses on the basis of amplitude only. I have found it possible to obtain improved rejection of noise by discriminating between signal pulses and noise pulses on the basis of pulse energy rather than pulse amplitude. In this manner, I achieve greater immunity to the effects of noise pulses which may have a large instantaneous amplitude but a short duration in relation to a signal pulse.

Figure 3:
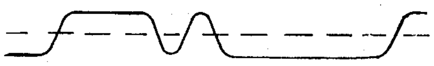
FIG. 3 represents an integrated dicode waveform.

FIG. 3 shows the dicode waveform of FIG. 2*b* after it has been integrated by any suitable integrating means. This integrated waveform is a measure of pulse energy. Precisely speaking, energy is proportional to the time integral of the square of the signal voltage, but I have not found it necessary or desirable to square the signal waveform. It can be seen that the peaks of the pulses of FIG. 2*b* correspond in general to midpoints in the waveform of FIG. 3. For convenience, FIGS. 1, 2, and 3 are drawn to the same time scale. Accordingly, such a midpoint represents half the energy of the pulse of FIG. 2*b* and also represents a suitable criteria for determining the presence of a signal pulse. If the waveform of FIG. 3 is symmetrical around zero potential, then every zero crossing in FIG. 3 will be indicative of a received dicode pulse. A dashed line is included in FIG. 3 to represent a median or ground potential. In general, the integrated value of random short noise pulses will not be sufficient to cause the waveform of FIG. 3 to execute a zero crossing and be detected as a spurious pulse.

Figure 4:
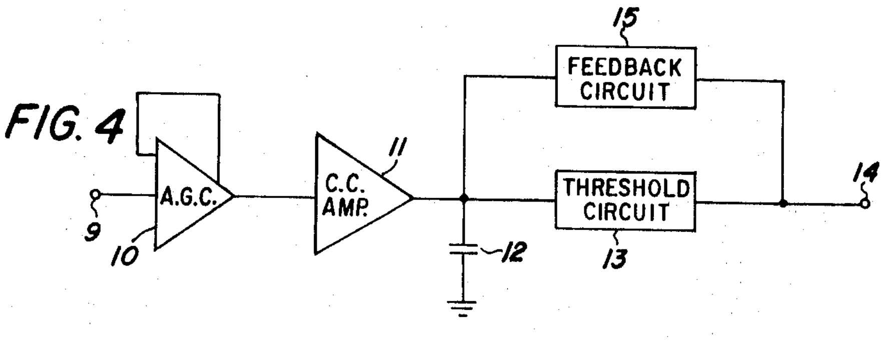
FIG. 4 is a block diagram of my invention.

FIG. 4 is a block diagram of an arrangement of circuits which may be used to carry out the decoding scheme generally suggested above. The dicode signal appearing at input terminal 9 is first passed through an automatic gain control amplifier 10 to compensate for gain variations in the transmission circuit and provide a signal having uniform signal pulse amplitudes. The next step is to integrate the signal. This may be done in various ways. The conventional way is to convert the input voltage waveform into a corresponding current waveform and apply this current to a capacitor. A high value resistor will convert a voltage into a current under appropriate conditions, but there is illustrated a constant current amplifier 11 which provides an output current proportional to input voltage and substantially independent of output voltage. This current from amplifier 11 is supplied to an integrating capacitor 12 to produce a waveform similar to that of FIG. 3. This waveform is then applied to a threshold circuit 13 to recreate at output terminal 14 a two-level signal corresponding to that of FIG. 1. The term "threshold circuit" is used in this specification and the claims to indicate a circuit or device having two output levels, one for input signals below a reference threshold level and the other for input signals above the same reference threshold level. A Schmitt trigger circuit is one common embodiment of threshold circuit 13. A simple grounded emitter transistor amplifier will also function as threshold circuit since its collector potential will be at either the emitter potential or the collector supply potential depending on whether the base potential is greater than or less than the emitter potential. There is, of course, a range of base potential in which the collector potential responds linearly, rather than stepwise, but it is possible to ignore this limited range of linear operation and consider a grounded emitter transistor or similar devices as constituting threshold circuits within the meaning of this specification.

The circuit as described to this point gives good rejection of randomly occurring noise signals for reasons previously described. However, a series of small noise pulses having the same polarity may be integrated by capacitor 12 to a potential above the threshold of circuit 13 to give a false output signal, even though the amplitude or energy of the individual noise pulses is substantially less than that of a true signal pulse. Immunity to this type of noise is provided by feed back circuit 15 which provides feed back current to capacitor 12 in a positive sense from the output of threshold circuit 13. The effect of feed back circuit 15 is to cause the potential on capacitor 12 to return towards its previous value after each noise pulse. More specifically, the potential on capacitor 12 is returned towards one of two specific values determined by threshold circuit 13 and feed back circuit 15. From a different point of view, the difference between the two-level output signal and the voltage on capacitor 12 is integrated and added to the voltage on capacitor 12. Feed back circuit 15 should be adjusted so that the potential on capacitor 12 responds much more slowly in response to an increment of voltage on the capacitor itself than to an increment of voltage applied at the input of amplifier 11. This prevents feed back circuit 15 from interfering with the normal function of the circuit to generate output transitions in response to input pulses of normal size. Feed back circuit 15 should, however, be capable of changing the potential at capacitor 12 as rapidly as possible without interfering with the normal signal integration process. Feed back circuit 15 may be a simple resistance network which provides an exponential type of restoration to capacitor 12.

Figure 5:
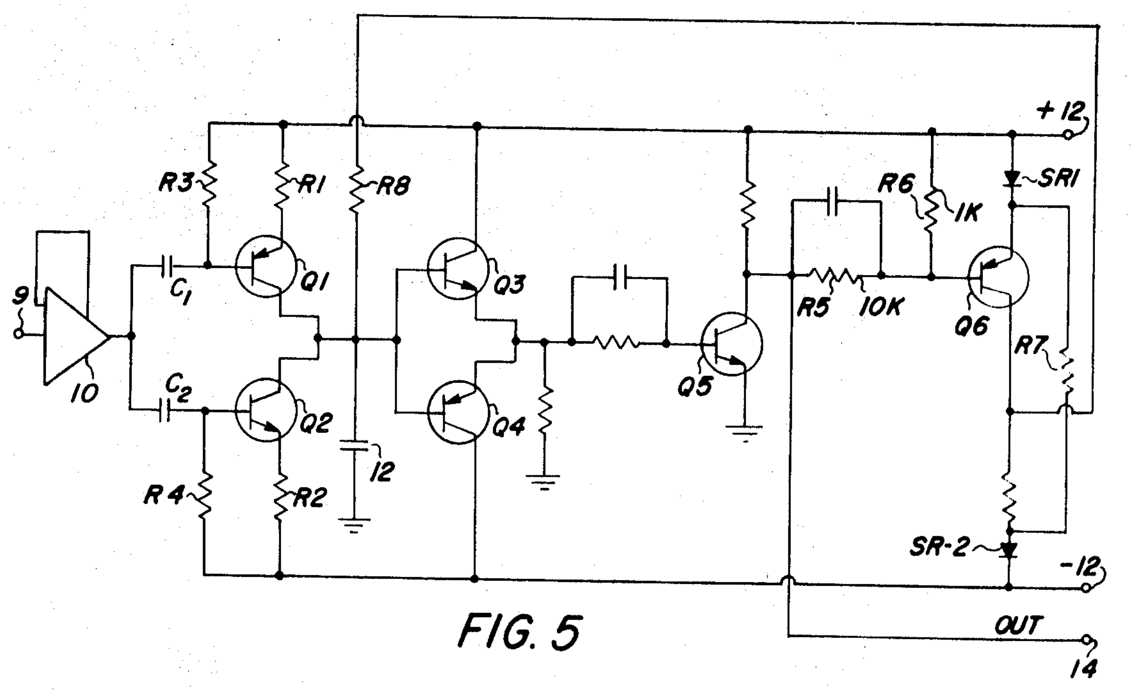
FIG. 5 is an illustrative circuit diagram.

FIG. 5 represents a specific illustrative circuit for carrying out my invention. The NPN and PNP transistors can be of type 2N1304 and 2N1305 respectively. Transistors Q1 and Q2 and associated components comprise the constant current amplifier 11 of FIG. 4. Q1 is a PNP transistor and Q2 is an NPN transistor. Their collectors are connected to integrating capacitor 12. It is characteristic of a high gain transistor that the emitter and collector currents are substantially equal. It is also characteristic of a transistor amplifier that the base to emitter voltage is small and essentially constant. Accordingly, the emitter current in Q1 is essentially the base voltage divided by the emitter resistor R1 and similarly the emitter and collector current of Q2 is the base voltage divided by the emitter resistor R2. R1 and R2 are normally equal to each other. If the input signal does not contain any DC component, as is true of dicode signals, it is convenient to AC couple the input signals to the bases of transistors Q1 and Q2, by coupling capacitors C1 and C2 respectively. This in turn permits the transistor bases to be referenced to the plus and minus supply voltages by base resistors R3 and R4 respectively. The time constant of C1 and R3 and of C2 and R4 should be long enough to pass the input pulses without distortion. In general, transistor Q1 will supply capacitor 12 with a current proportional to negative input pulses and transistor Q2 will supply capacitor 12 with a current proportional to positive input pulses. The voltage on capacitor 12 will thus be the negative integral of the voltage supplied by automatic gain control amplifier 10.

The voltage on capacitor 12 is passed, via a high input impedance emitter follower composed of transistors Q3 and Q4, to the base of transistor Q5. Since the emitter of Q5 is grounded, the collector potential switches between ground potential and supply potential as its base potential passes through ground. Since Q5 is an NPN transistor, its collector potential falls to zero when its base potential is positive and its collector potential rises to the value of the positive collector supply voltage when the base voltage is negative. Accordingly, the collector of Q5 effectively constitutes the output terminal 14 of FIG. 4.

Since the potential at the collector of Q5 varies in a direction opposite to that at capacitor 12, this potential is applied, through a voltage divider composed of resistors R5 and R6 to a common emitter transistor Q6. In order to assure positive turnoff of Q6, its emitter is returned to a potential which is a few tenths of a volt more negative than the positive supply voltage by virtue of the forward voltage drop across diode SR1. A resistor R7 provides the necessary forward current through SR1 when Q6 is nonconducting. A second forward biased diode SR2 is provided to make the output of Q6 symmetrical with respect to ground. Thus, the potential of the collector of Q6 is either slightly less than the positive supply voltage or slightly less than the negative supply voltage, and is in phase with the potential on capacitor 12. The collector of Q6 is connected to integrating capacitor 12 by a feed back resistor R8. Accordingly, capacitor 12 always tries to charge up to or down to the collector potential of Q6. This provides the impulse noise rejection previously referred to. The voltage drops caused by diodes SR1 and SR2 are too small to have any affect on the operation of the feed back circuit.

Transistors Q1 and Q2 will integrate an input signal provided that the integrated signal lies between the supply voltages applied to Q1 and Q2. In other words, Q1 and Q2 will also limit or clip the integrated signal. It is desirable that the output of amplifier 10 be so adjusted relative to transistors Q1 and Q2 and associated components so that some limiting actually takes place during each integration of a positive or negative input signal pulse. In other words, the input signals should at least slightly exceed the linear integrating capability of transistors Q1 and Q2 and capacitor 12. This represents a desirable, although not an essential, operating condition because each input pulse causes the voltage on capacitor 12 to be integrated upwards or downwards from a fixed, determined potential.

The feed back circuit always tries to restore the potential on capacitor 12 to a value essentially determined by the positive or negative supply potential applied to transistor Q6. For efficient operation of the circuit, these potentials should be symmetrical about zero and at least approximately equal to the potentials to which capacitor 12 is driven by normal input pulses. Since the feed back circuit tends to clamp the potential at capacitor 12 at a fixed potential between input signals, this function can be substituted for the limiting function performed by transistors Q1 and Q2. In other words, transistors Q1 and Q2 can be supplied with voltages higher than those supplied to Q6 or the input signal can be reduced in amplitude from that previously described. FIG. 5 shows a particular operating condition where transistors Q1, Q2 and Q6 are all operated from the same supply potentials. The input signal to transistors Q1 and Q2 may be adjusted so that its integrated value at capacitor 12 is close to that of the supply voltages applied to transistors Q1, Q2 and Q6 and preferably slightly above.

The circuit of FIG. 5 is a fully operative embodiment of the invention and has shown an advantage of approximately 2 db. in noise rejection capabilities as compared to an ordinary voltage comparison data set circuit. Obviously, the improvement in noise rejection will depend on the specific type of noise voltages which are encountered. It will also be understood that the circuit of FIG. 5 is intended merely to illustrate the principles of the invention and many modifications will immediately occur to any skilled electronic circuit designer. For example, different types of integrators may be employed, transistor Q5 could be replaced by a Schmitt trigger circuit, vacuum tube circuits could be employed and the like. The scope of the invention is accordingly to be determined by the claims.

What is claimed is:

1. The method of decoding a three-level dicode signal comprising integrating said dicode signal and generating a two-level signal from said integrated signal, said two-level signal being determined by the sign of the difference between said integrated signal and a fixed potential.

2. The method of claim 1 in which said fixed potential is the median value of said integrated signal.

3. The method of decoding a three-level dicode signal comprising integrating said dicode signal to form an integrated dicode signal, generating a two-level signal from said integrated dicode signal, said two-level signal being determined by the sign of the difference between said integrated dicode signal and a fixed potential, integrating the difference between said two-level signal and said integrated dicode signal to form an integrated error signal, and adding said integrated error signal to said integrated dicode signal to form a sum thereof.

4. The method of decoding a three-level dicode signal comprising integrating said dicode signal to form an integrated dicode signal, generating a two-level signal from said integrated dicode signal, said two-level signal being determined by the sign of the difference between said integrated dicode signal and a fixed potential, integrating the difference between said two-level signal and said integrated dicode signal to form an integrated error signal, and adding said integrated error signal to said integrated dicode signal to form a sum thereof, wherein the sum of said integrated signals is symmetrically limited to a fixed absolute value.

5. A dicode signal decoding system comprising a current generator circuit for providing an output current proportional to the voltage of a dicode input signal, an integrating capacitor connected to said current generator circuit, a threshold circuit connected to said integrating capacitor and having a switching threshold at the median potential of said capacitor, and a feedback circuit connected between the output of said threshold circuit and said capacitor, wherein said feedback circuit comprises a series of impedance.

6. The circuit of claim 5 further including a symmetrical limiter connected to said integrating capacitor.

7. In a graphic communication system wherein binary information is transmitted as a three-level dicode signal, a dicode decoder comprising

- constant current amplifier means in conjunction with an integrating capacitor for integrating said dicode signal,
- threshold circuit means responsive to said integrated dicode signal having a switching threshold at the median potential of said integrating capacitor for generating the dicode binary information,
- feedback circuit means coupled to the output of said threshold circuit means and said integrating capacitor for limiting the effects of noise pulses in the dicode signal, and
- automatic gain control means coupled to the input of said constant current amplifier means to compensate for gain variations in the dicode signal.

* * * * *